US009005642B2

(12) United States Patent
Mabey et al.

(10) Patent No.: US 9,005,642 B2
(45) Date of Patent: *Apr. 14, 2015

(54) INTUMESCENT FIRE RETARDANT PAINT WITH INSECTICIDE

(75) Inventors: Michael John Mabey, Sherwood Park (CA); William Kish, Wadsworth, OH (US)

(73) Assignee: No-Burn Investments, L.L.C., Wadsworth, OH (US)

( * ) Notice: Subject to any disclaimer, the term of this patent is extended or adjusted under 35 U.S.C. 154(b) by 2027 days.

This patent is subject to a terminal disclaimer.

(21) Appl. No.: 11/654,487

(22) Filed: Jan. 17, 2007

(65) Prior Publication Data
US 2008/0054230 A1 Mar. 6, 2008

Related U.S. Application Data

(60) Provisional application No. 60/761,646, filed on Jan. 24, 2006.

(51) Int. Cl.
C09K 21/06 (2006.01)
C09D 5/18 (2006.01)
C09D 5/14 (2006.01)

(52) U.S. Cl.
CPC . *C09D 5/185* (2013.01); *C09D 5/14* (2013.01)

(58) Field of Classification Search
CPC ... A01N 53/00; A01N 33/12; A01N 2300/00; A01N 25/04
See application file for complete search history.

(56) References Cited

U.S. PATENT DOCUMENTS

| | | | |
|---|---|---|---|
| 3,196,108 A | 7/1965 | Nelson | 252/2 |
| 3,257,316 A | 6/1966 | Langguth et al. | 252/2 |
| 3,309,324 A | 3/1967 | Langguth et al. | 252/387 |
| 3,513,114 A | 5/1970 | Vandersall et al. | 523/179 |
| 3,634,234 A | 1/1972 | Morgenthaler | 252/7 |
| 3,730,890 A | 5/1973 | Nelson | 252/7 |
| 3,899,810 A | 8/1975 | Stanley et al. | 28/166 |
| 3,934,066 A * | 1/1976 | Murch | 442/221 |
| 3,955,987 A | 5/1976 | Schaar et al. | 106/15 FP |
| 3,955,997 A * | 5/1976 | Sagane et al. | 524/24 |
| 3,960,735 A | 6/1976 | Lacey | 252/2 |
| 3,969,291 A | 7/1976 | Fukuba et al. | 523/179 |
| 4,028,333 A | 6/1977 | Lindvay | 260/45.8 NT |
| 4,137,849 A | 2/1979 | Hontgas et al. | 102/56 R |
| 4,166,840 A | 9/1979 | Chapman | 423/313 |
| 4,201,593 A | 5/1980 | Sienkowski et al. | 106/18.14 |
| 4,201,677 A | 5/1980 | Shukla et al. | 252/8.1 |
| 4,205,022 A | 5/1980 | Nicholson et al. | 260/753 |
| 4,210,452 A | 7/1980 | Nicholson et al. | 106/18.18 |
| 4,216,261 A | 8/1980 | Dias | 442/84 |
| 4,221,837 A | 9/1980 | Nicholson et al. | 428/288 |
| 4,226,907 A | 10/1980 | Sienkowski et al. | 428/288 |
| 4,241,145 A | 12/1980 | Shukla | 428/537 |
| 4,265,791 A | 5/1981 | Nicholson et al. | 252/8.1 |
| 4,283,501 A | 8/1981 | Brady et al. | 524/35 |
| 4,339,357 A | 7/1982 | Nicholson et al. | 252/606 |
| 4,345,002 A | 8/1982 | Smith et al. | 428/288 |
| 4,365,025 A | 12/1982 | Murch et al. | 521/159 |
| 4,447,336 A | 5/1984 | Vandersall | 252/7 |
| 4,447,337 A | 5/1984 | Adl et al. | 252/7 |
| 4,588,510 A | 5/1986 | Salyer et al. | 252/5 |
| 4,595,414 A | 6/1986 | Shutt | 106/18.16 |
| 4,602,011 A * | 7/1986 | West et al. | 514/187 |
| 4,606,831 A | 8/1986 | Kegler et al. | 252/7 |
| 4,632,813 A | 12/1986 | Anastasi et al. | 423/310 |
| 4,668,710 A | 5/1987 | Pawloski et al. | 521/171 |
| 4,686,241 A | 8/1987 | Pawloski et al. | 521/107 |
| 4,744,965 A | 5/1988 | Fairchild | 423/310 |
| 4,816,186 A | 3/1989 | Acitelli | 252/610 |
| 4,822,524 A | 4/1989 | Strickland | 252/603 |
| 4,839,065 A | 6/1989 | Vandersall | 252/603 |
| 4,983,326 A | 1/1991 | Vandersall | 252/603 |
| 5,064,710 A | 11/1991 | Gosz | 428/182 |
| 5,165,904 A | 11/1992 | Staffel et al. | 423/305 |
| 5,246,652 A | 9/1993 | Hsu et al. | 264/109 |
| 5,332,765 A * | 7/1994 | Lorentzen et al. | 523/122 |
| 5,399,375 A | 3/1995 | Rood | 427/203 |
| 5,462,699 A | 10/1995 | Montgomery | 252/609 |
| 5,603,990 A | 2/1997 | McGinniss et al. | 427/393.3 |
| 5,626,787 A | 5/1997 | Porter | 252/4 |
| 5,645,926 A | 7/1997 | Horrocks et al. | 442/234 |
| 5,702,768 A * | 12/1997 | Orr | 427/236 |
| 5,723,515 A | 3/1998 | Gottfried | 523/179 |
| 5,730,907 A | 3/1998 | Schultz et al. | 252/400.62 |
| 5,824,723 A | 10/1998 | Yano et al. | 524/262 |
| 5,882,541 A | 3/1999 | Achtmann | 252/8.05 |
| 5,882,550 A | 3/1999 | Regan | 252/609 |
| 5,912,003 A | 6/1999 | Chang | 424/405 |
| 5,925,457 A | 7/1999 | McGinniss et al. | 428/341 |
| 5,931,994 A | 8/1999 | Mateo Herrero | 106/15.05 |
| 5,968,669 A | 10/1999 | Liu et al. | 428/537.1 |
| 5,989,706 A | 11/1999 | McGinniss et al. | 428/341 |
| 5,997,758 A | 12/1999 | Barbarin et al. | 252/3 |
| 6,001,285 A | 12/1999 | Wunram | 252/606 |

(Continued)

OTHER PUBLICATIONS

Texanol Ester Alcohol—The Premier Coalescent, Eastman Chemical Company. Publication M-329, published Nov. 2005.*
"The Benefits of Microspheres." Chris Rosenbusch/ Expancel Inc, Duluth, Ga; and Bruce Holcomb/3M, St Paul, MN. Aug. 1, 2003.*
Cary Company, The, Home Page of the web site, Products page of the web site, and Flame Retardants & Smoke Suppressant Additives page of the web site (www.thecarycompany.com/Home.html + . . . / productsl.html + . . . /products/Kemgard.html) downloaded Dec. 16, 2004.
Environmental Working Group, Chemical Industry Archives, "3M and Scotchgard: 'Heroes of Chemistry' or a year coverup?" p. 1 (www.chemicalindustryarchives.org/dirty_secrets/scotchgard/1. asp) downloaded Jan. 31, 2006.

(Continued)

*Primary Examiner* — Audrea Buckley
(74) *Attorney, Agent, or Firm* — Christopher John Rudy

(57) ABSTRACT

Intumescent fire retardant paint includes an insecticide. The paint can be a latex. Another active agent, for example, a mold inhibitor, may be included. The insecticide may be, for example, a termiticide.

20 Claims, No Drawings

(56) References Cited

U.S. PATENT DOCUMENTS

| | | | |
|---|---|---|---|
| 6,025,027 A | 2/2000 | Shutt | 427/337 |
| 6,080,796 A * | 6/2000 | Liebert et al. | 521/64 |
| 6,084,008 A | 7/2000 | Liu | 523/179 |
| 6,130,267 A | 10/2000 | Dueber et al. | 521/128 |
| 6,162,375 A | 12/2000 | Crouch et al. | 252/603 |
| 6,207,085 B1 | 3/2001 | Ackerman | 252/606 |
| 6,632,442 B1 * | 10/2003 | Chyall et al. | 424/400 |
| 6,881,248 B2 | 4/2005 | Lee et al. | 106/18.32 |
| 6,982,049 B1 * | 1/2006 | Mabey et al. | 252/606 |
| 6,989,113 B1 | 1/2006 | Mabey | 252/606 |
| 7,482,395 B2 * | 1/2009 | Mabey et al. | 523/122 |
| 2004/0173783 A1 | 9/2004 | Curzon et al. | 252/602 |
| 2005/0022466 A1 | 2/2005 | Kish et al. | 52/741.3 |
| 2005/0058689 A1 * | 3/2005 | McDaniel | 424/426 |
| 2005/0138888 A1 | 6/2005 | Kish et al. | 52/741.3 |
| 2005/0217537 A1 * | 10/2005 | Knipe | 106/493 |
| 2006/0167131 A1 | 7/2006 | Mabey et al. | 523/122 |
| 2006/0189232 A1 | 8/2006 | Kish et al. | 442/59 |

OTHER PUBLICATIONS

Farrell et al., *Environmental Toxicology and Chemistry*, abstract for vol. 17, No. 8, pp. 1552-1557, 1998.
Frelo Technology, LLC, HomeGuard fire retardant with mold inhibitor (www.frelo.com/ . . . ) downloaded Nov. 7, 2006.
International Fireproof Technology, Inc., PTP DC-333 fire retardant latex paint with black mold inhibitor (www.painttoprotect.com/ . . . ) downloaded Oct. 31, 2006.
Kia Inc., Kemco International Associates Biocides (www.kemcointernational.com/Biocides.htm) downloaded Dec. 16, 2004.
Kish, Wm., U.S. Appl. No. 11/654 467, filed Jan. 17, 2007.
Kish, Wm., U.S. Appl. No. 11/654,467, filed Jan. 17, 2007.
Mabey et al., U.S. Appl. No. 11/654,486, filed Jan. 17, 2007.
Mabey et al., U.S. Appl. No. 60/761,646, filed Jan. 24, 2006.
Mason Chemical Co., "MAQUAT 2.5-M," May 1, 2002.
Mason Chemical Co., MSDS Mason CS428, Jan. 2003 A.D.
Mohawk Finishing Products, Mohawk Finishing Search Results, fabric guard and Mohawk Site (search.atomz.com/search/ . . . ); Mohawk-Finishing.com, home; Fabric Guard (Reg. U.S. Pat. & Tm. Off.) Product Data Sheet; Fabric Guard Material Safety Data Sheet; Fabricsafe Aerosol Material Safety Data Sheet (www.mohawk-finishing.com/ . . . ) downloaded Feb. 4, 2004.
Verichem Inc., web site information and product line pages (www.verichem.org/pages/5/page5.html?refresh=1079996004846) (www.verichem.org/pages/3/page3.html?refresh=1079996005142) (www.verichem.org/pages/2/page2.html?refresh=1079996005008) downloaded Dec. 21, 2004.
3M Home Care Division, Scotchgard (TM) fabric protector, trade dress, aerosol can, 2002 A.D.
3M Worldwide, scotchguard from 3m.com, Patsy Sherman and the discovery of Scotchgard (TM) Fabric Protector (www.3m.com/about3M/pioneers/sherman.jhtml) downloaded Jan. 31, 2006.
3M Worldwide, Scotchgard (TM) Protector, home; Scotchgard (TM) Protector Carpet Care; Scotchgard (TM) Furniture Care—Do-It-Yourself Products—Fabric Protector; Scotchgard (TM) Protector Outdoor Care (www.3m.com/us/home_liesure/scotchgard/ . . . ) downloaded Jan. 30, 2006.
Bluwood, U.S. Tm. Reg. No. 3,269,118 (Jul. 24, 2007), Latest Status Info by TARR system downloaded Jul. 29, 2008.
IDollarStore, "What is MDF, Medium-density fiberboard," p. 1 of 2 (www.idollarstore.com/what_is_mdf.htm) downloaded May 29, 2008.
U.S. Tm. Reg. No. 3,056,604 (Jan. 31, 2006).
National Research Council Canada, Canadian Building Digests, NRC-IRC publications, "CBD-141, Flammability of Lining and Insulating Materials," Sep. 1971, www.nrc-cnrc.gc.ca/ . . . , 5 pages, printed Jul. 9, 2010.
Universal Fire Shield, LLC, Florida 33803 USA, "Termite & Fire Triple Shield Protection," www.firechemicals.com, 1999, 2 pages.
Underwriters' Laboratories, "UL 94, the Standard for Safety of Flammability of Plastic Materials for Parts in Devices and Appliances testing," 2011, 2 pp.
Underwriters' Laboratories, ul-94.5, "Tests for Flammability of Plastic Materials for Parts in Devices and Appliances, UL 94, Scope," Jun. 2, 2006, 1 p.
D. Harms Spider mites—Wee Pest, Mighty Problem Aug. 8, 2002 (http://www.agprofessional.com/croptalk php?id=14755 pp. 1-2).
Phenol DHSS Guidelines: Dept of Health and Human Services ATSDR (Agency for Toxic Substances & Disease Registry "ATSDR—MMG. Phenol" http //www atsdr.dcd gov/mhmi/mmg115.html pp. 1-12; p. 2 Sources/Uses.
Henneberry et al. J Econ Entomology vol. 55 No. 3 pp. 332-334 1962 (col. 2 p. 332).

* cited by examiner

INTUMESCENT FIRE RETARDANT PAINT WITH INSECTICIDE

This claims benefits under 35 USC 119(e) of application No. U.S. 60/761,646 filed on Jan. 24, 2006 A.D. The specification of that application is incorporated herein by reference.

FIELD AND PURVIEW OF THE INVENTION

The invention generally concerns a composition embracing an intumescent fire retardant paint, especially a latex; and an insecticide, notably a termiticide. The composition may further include another active agent, for example, a mold inhibitor. Of concern are methods to make and use the composition, and a substrate in combination with the composition or residue whereof.

BACKGROUND TO THE INVENTION

Various fire retardant compositions are known. Certain of these can be in a form of an intumescent composition, coating or paint. See, e.g., U.S. Pat. Nos. 5,989,706; 5,925,457; 5,645,926; 5,603,990; 5,064,710; 4,635,025; 4,345,002; 4,339,357; 4,265,791; 4,241,145; 4,226,907; 4,221,837; 4,210,452; 4,205,022; 4,201,677; 4,201,593; 4,137,849; 4,028,333; 3,955,987 and 3,934,066. The intumescent fire retardant may be associated with latex. Note, the latter two ('987 and '066) patents. Various organizations, for example, the Cary Company, Addison, Ill., U.S.A., Kemco International Associates, St. Pete, Fla., U.S.A., and Verichem, Inc., Pittsburgh, Pa., U.S.A., may make available certain components for certain paints and coatings including flame retardant and smoke suppressant additives, and certain biocides. Various other fire retardant art is known. See, e.g., U.S. Pat. Nos. 6,207,085; 5,997,758; 5,882,541; 5,626,787; 5,165,904; 4,744,965; 4,632,813; 4,595,414; 4,588,510; 4,216,261; 4,166,840; 3,969,291 and 3,513,114.

A highly effective fire retardant intumescent latex paint is commercially available from NO-BURN, INC., Wadsworth, Ohio, U.S.A. as NO-BURN® PLUS latex paint product. This can be employed, for example, in residential and commercial structures including homes to provide fire resistant properties to the structure. Compare, U.S. patent application Pub. Nos. 2005/0138888 and 2005/0022466.

A mold inhibitor can be employed with such a product as, for example, in the case of NO-BURN PLUS MIH fire retardant intumescent latex paint with mold inhibitor. This is also commercially available from NO-BURN, INC. Note, U.S. patent application Ser. No. 11/320,207, which published as Pub. No. US 2006/0167131 A1 and is now U.S. Pat. No. 7,482,395 B2.

Compare, U.S. Pat. Nos. 6,989,113 and 6,982,049, both of which concern ammonium phosphate containing fire retardant coatings, preferably for interior woodwork, the latter of which includes a mold inhibitor. These are preferably embodied, respectively, as NO-BURN® WOOD GARD and NO-BURN® WOOD GARD MIH products, which are commercially available from NO-BURN, INC. Note, U.S. provisional patent application Nos. 60/670,121 and 60/656,148, both of which concern improvements to fire retarding compositions, especially in a spray-on type, for example, NO-BURN® FABRIC FIRE GARD spray from NO-BURN, INC. In such latter improvements, mold inhibiting and/or stain protecting properties are also provided.

Insect damage to building structures, including homes, notably, for example, from termites, especially in warmer climates, is also a problem of concern. In address of this, various insect- and termite-protection products are also known. Note, U.S. Pat. No. 6,896,908, which discloses a wood-preservative concentrate of a leach-resistant borate for lignocellulosic-based products to provide resistance against insect and fungal attack; and U.S. Pat. Nos. 6,894,074 and 6,716,874, which disclose synergistic insecticidal mixtures.

FULL DISCLOSURE OF THE INVENTION

I. Objects:

It is a general object to improve upon the art. It is a particular object and desire to provide protection from insect and so forth pests, and notably termites, to a fire retardant composition. It is a further particular object and desire to do the same with fire retardant compositions that have other capabilities such as stain-protection and/or mold-inhibition, most especially the latter. It is a special object and desire to provide the same with an intumescent fire retardant paint formulation, especially a latex formulation, for example, NO-BURN® PLUS or NO-BURN® PLUS MIH products, while retaining desirable properties of the composition. It is an especially desirable object to provide for control of termite infestation and feeding, on and through the surface of a material coated with the fire retardant composition.

These and other objects are satisfied, at least in part, by the present invention.

II. Provisions

In general, provided is a composition comprising an intumescent fire retardant paint and an insecticide. The composition is beneficially a latex. The composition may further include another active agent, for example, a mold inhibitor. The insecticide may be, for example, a termiticide. The paint can be in a form of a finish paint or primer. Such a composition can be made by contacting paint-forming ingredients with a fire retardant, optionally with a mold inhibitor or other active agent; and the insecticide, under conditions sufficient to form the composition; it can be used by contacting it with a substrate, which beneficially is otherwise flammable. Another aspect is the composition or its residue in combination with the substrate.

The invention is useful in protecting building structures, their contents and/or their occupants, in general, from fire, insect damage or annoyance, optionally mold, and so forth.

Significantly, by the invention, problem(s) in the art is(are) ameliorated if not overcome. An effective, cost-efficient, aesthetically pleasing and/or generally safe fire retardant providing protection from insects, notably termites, is provided. Other active agents beneficially can provide protection from mold, notably toxic black mold (*Stachybotrys chartarum*). Thus, for example, flammable construction stock such as of wood can be provided with good fire retardant capability and effective control of termites as well as toxic black mold. Application of the paint is simple and easy, and coverage can be excellent. Addition of the insecticide ingredients adds notable value to the fire retardant. The composition can advantageously be applied directly to a wide range of materials, including wood, plywood, oriented strand board and chip board sheathing, paper, fabrics, corrugated board materials, and so forth and the like. It is efficient and reasonably safe to manufacture, store, transport and use. One of the many advantages of the present composition is that, since it can be applied directly to building materials before or on site, it greatly reduces financial and environmental costs in new structures of rendering materials fire retardant and termite resistant. Further, building materials may be rendered fire retardant and termite-repellant after construction by application of the present composition. In a particularly advantageous embodiment, the composition may be considered to be an intumescent fire retardant, mold inhibitor, and termite repellant latex paint, which can provide these properties at once through a common application of a beautiful and durable paint. The composition of the invention can have a "Class A" flame spread rating under the ASTM-E84 test. Embodiments of the invention can be considered improvements in kind to the already excellent, commercially available NO-BURN® PLUS and NO-BURN® PLUS MIH intumescent fire retardant latex paints.

Numerous further advantages attend the invention.

The invention can be further understood by the additional detail set forth below. The same, like that set forth above, is to be taken in an illustrative and not necessarily limiting sense.

Broadly, an intumescent fire retardant paint is combined with an insecticide. A mold inhibitor or other active agent may be combined therewith.

A foundation of preferred embodiments of the invention is that an intumescent fire retardant paint base with or without mold inhibitor or other active agent can be prepared, and during or after its preparation can be added the insecticide. The insecticide, for example, may be added to the base immediately upon its manufacture. Conditions are those sufficient to form the composition. Stirring or other agitation of the composition can enhance its uniformity.

The term, "fire retardant paint," as employed herein is a paint, preferably a latex paint, composition that, when applied to a flammable material, provides thermal protection for the material. In general, this may be done by reducing or perhaps even eliminating the tendency of the material to burn and/or reducing the rate of flame spread along the surface of the material. Preferably, use of the fire retardant paint, for example, on a solid material as the substrate, reduces surface burning characteristics significantly, say, at least about 10%, at least about 25%, or at least about 50%, when compared to untreated material, as tested by an appropriate test. For example, the test may be the ASTM E84 Steiner Tunnel Test. Without being bound by any theory, the preferred fire retardant paint of the present invention, based in general on the Form #2 fire retardant paint of the aforementioned '466 and '888 publications, more preferably the NO-BURN PLUS paint, can be considered to be an intumescent fire reactant. Although it looks and applies like regular paint, its chemical composition changes drastically when introduced to heat. Thus, when heat is applied, the fire retardant paint of the invention may "foam up" to form an intact, fire-resistive "char-barrier" to protect the treated surface. As a result, fire is robbed of fuel and oxygen, generates less heat and smoke, and may in some circumstances extinguish itself. Fire retardant paint formulations can vary, but may be a latex formulation and include ingredients added with water as follows in percentages, which may be considered approximate:

| | |
|---|---|
| Ammonium phosphate solids | 15~30% by weight |
| Thermoplastic latex resin, e.g., polyvinyl acetate type | 10~30% by weight |
| Nitrogenous spumific, e.g., melamine powder | 7~13% by weight |
| Carbonific, e.g., polyol | 7~13% by weight |
| Titanium dioxide and/or other inert inorganic opacifying agent | 5~10% by weight |
| Soda lime borosilicate or other glass | 1~5% by weight |
| Ester alcohol | 0.5~1.5% by weight |
| Hydroxyalkylcellulosic | 0.1~1% by weight |
| Wetting and/or other agent(s) | 0.1~2% by weight. |

A more particular base intumescent fire retardant latex paint formulation follows:

| | |
|---|---|
| Water (bulk) | 25~33% by weight |
| Ammonium polyphosphate powder | 20~21% by weight |
| Vinyl acetate latex (aqueous) | 21~22% by weight |
| Melamine powder | 9~10% by weight |
| Pentaerythritol | 8.5~9.5% by weight |
| Titanium dioxide powder | 7~8% by weight |
| Glass bubbles (0.12~0.63 g/cc) | 1~2% by weight |
| 2,2,4-trimethyl-1,3-pentanediol monoisubutyrate | 0.6~0.8% by weight |
| Hydroxyethylcellulose | 0.2~0.4% by weight |
| Wetting and/or other agents | ~1% by weight. |

With such a base fire retardant latex paint formulation or any other suitable fire retardant paint formulation, or precursor part thereof, is provided the insecticide; it may be added during manufacture of the base, or afterwards. Again, a mold inhibitor may be provided, and it may be provided before, during or after provision of the insecticide.

As the ammonium phosphate, any suitable ammonium phosphate salt, to include ammonium polyphosphates, and mixtures thereof, may be employed. Advantageously, it is a solid, which may be provided as a powder. Such a salt may be a mixture, which contains monoammonium and diammonium phosphates. Such a salt may be commercially obtained.

As the thermoplastic latex resin such as polyvinyl acetate latex, any suitable polyvinyl acetate latex type polymer, copolymer or mixture thereof, or the like, may be employed. The polyvinyl acetate type latex component may be provided as an aqueous emulsion. Also, other thermoplastic latex resins that may function in this capacity would include such resins as polyvinyledene chloride resins and so forth and the like, although perhaps not functioning as effectively as the preferred vinyl acetates.

As the nitrogenous spumific, any suitable hydrogen-containing nitrogenous organic compound may be employed. Preferably, the spumific is compatible with the other components employed, and further is dispersible therewith. For instance, melamine may be employed.

As the carbonific, any suitable hydroxyl-containing organic compound may be employed. Preferably, the carbonific is compatible with the other components employed, and further is dispersible in the water or other diluent employed. For instance, a polyol may be employed. The polyol may be a compound such as glycerol, pentaerythritol, dipentaerythritol, tripentaerythritol; a sugar, say, a monosaccharide such as a triose, tetrose, pentose, hexose, heptose, or octose, to include an aldose or a ketose, or a disaccharide, a trisaccharide, a polysaccharide, and so forth; and/or a starch. A combination of polyols may be employed. Pentaerythritol is a preferred selection.

As the opacifying agent, titanium dioxide powder is preferred. Although pure titanium dioxide powder may be employed, more commonly it is employed in a grade that contains other inert inorganic substances, for example, aluminum hydroxide and/or amorphous silica. An opacifying agent such as titanium dioxide can be employed in an aqueous dispersion form.

A glass additive such as borosilicate and/or other glass may be provided, preferably in the form of glass bubbles of a size in the range of a powder. This improves the body of the paint and may provide it with thixotropic or other advantageous viscous flow properties.

As the ester alcohol, any suitable ester alcohol may be employed. The ester alcohol may be an alkanol alkylate, for example, 2,2,4-trimethyl-1,3-pentanediol monoisubutyrate. The ester alcohol functions as a coalescent for film integrity, and so forth.

As the hydroxyalkylcellulosic, any hydroxyalkylcellulose or suitable analog or derivative thereof may be employed. It may be hydroxymethylcellulose or hydroyethylcellulose, preferably the latter. The hydroxyalkylcellulosic functions to improve the flow and rheology of the finished paint solution or suspension, reducing sag and improving film build.

Wetting and/or other agent(s) may be employed. Such agent(s) can include what may be considered surface tension lowering agents, surfactants, defoaming agents, dispersing agents, paint preservatives, which may be biocidal, and so forth and the like. Thus employed in minor amounts may be a pigment dispersing agent such as an alkali metal salt of a polymeric carboxylic acid, say, the sodium salt of a copolymer of maleic acid; a defoamer colloid such as an acrylic polymer, say, sodium polyacrylate; a silicone surfactant such as a polyether modified alkyl polysiloxane, say, a polyether modified poly-dimethyl-siloxane, which may be employed neat or preferably in solution with a suitable solvent, say, about half dipropyleneglycol monomethyl ether (48%); a paint preservative/biocide such as containing 1,2-benzisothiazol-3(2H)-one, say, as an aqueous mixture containing 1,2-benzisothiazol-3(2H)-one, sodium hydroxide, and dipropyleneglycol; and a rheology modifier such as a hydrophobically modified ethylene oxide urethane block copolymer, which may be employed in an organic solvent mixture such as a mixture of butyl carbitol and water or without the organic solvent, say, in water only. For instance such wetting and/or other agent(s) can include compounds or compounds such as follows, the percentages of which relate to the base latex paint formulation and are given by weight, and may be considered to be approximate:

| Pigment dispersing agent | sodium salt of polymeric maleic acid (NaOH stabilized) | 0.1~0.3% |
|---|---|---|
| Defoamer colloid | sodium polyacrylate | 0.1~0.3% |
| Silicone surfactant | polyether modified poly-dimethyl-siloxane in dipropyleneglycol monomethyl ether (48%) | 0.01~0.1% |
| Paint preservative/ biocide | 1,2-benzisothiazol-3(2H)-one in an aqueous mixture containing 1,2-benzisothiazol-3(2H)-one, sodium hydroxide, and dipropyleneglycol | 0.01~0.05% |
| Rheology modifier | hydrophobically modified ethylene oxide urethane block copolymer in water | 0.25~0.1% |
| Mold Inhibitors | | 0.5 to 3.0% |

Other additive(s) may be employed.

The term, "insecticide," is an agent that can kill, control and/or repel a target invertebrate. The target invertebrate can be an insect per se, for example, a termite, a carpenter, sweet or grease eating ant, a bee, hornet or wasp, a roach, a fly, a mosquito, a cricket, an earwig, a silverfish, a tick, a flea, a beetle, and so forth; another arthropod such as a spider, a centipede, and so forth; and/or a worm or even a snail or slug, and so forth. Target invertebrates considered building pests, which could include the termites, ants, bees, hornets and wasps, roaches, crickets, earwigs, silverfish, fleas, beetles, and spiders, especially termites, desirably are killed, controlled and/or repelled hereby.

Any suitable insecticide can be employed in the practice of the present invention, alone or in combination with another insecticide. Preferably, the insecticide is soluble or otherwise able to be carried with the remaining ingredients of the invention such as by dispersion, emulsion, and so forth, and preferably does not hinder any solubility or otherwise any capacity for being carried likewise of other ingredients of the composition of the invention, for example, the mold inhibitor. Preferably, too, the insecticide does not alter, at least significantly, other desirable physical characteristic(s) of the composition that would otherwise exist without it such as, for example, pH, viscosity, and so forth. Preferably also, the insecticide is stable in the composition before, i.e., "in the can," and after application to the substrate, so as to provide for contact with the target invertebrate. An insecticide may be fire retardant or fire accelerative, but, in the latter case, does not accelerate fire to a degree that the overall composition which contains the insecticide cannot be considered to be a fire retardant composition. Preferably, the insecticide, when applied to a suitable substrate in a suitable amount, provides measurable protection to the substrate from the target invertebrate(s). The measurable protection may be tested by a standard protocol. For example, with the substrate wood and the target invertebrate a termite, the protection may be measured by the American Wood-Preservers' Association Standard E1-97 protocol. Be that as it may, the insecticide may be or include inorganic, organic, natural and/or synthetic components, thus perhaps being or including Arsenic, Lead, Mercury, Thallium, or a compound of such, Phosphorus, an organophosphate, Sulfur, an organothio compound, a chlorinated organic compound, a pyrethroid, carbamide, carbimide, cyclopropanecarboxylate, a pyrethrin, and/or a piperonyl ether; examples may include, malathion, parathion, diazinon (0,0-diethyl-0,2-isopropyl-6-methyl(pyrinodine-4-yl)phosphorthioate), permethrin ((3-phenoxyphenyl)methyl(±)cis-trans-3-(2,2-dichloroethenyl)-2,2-dimethylcyclopropanecarboxylate) or CAS No. 52645-53-1), resmethrin, d-trans-allethrin, tetramethrin ((1-cyclohexene-1,2-dicarboximide) methyl-2,2-dimethyl-3-(2-methylpropenyl) cyclopropanecarboxylate), sumithrin (3-phenoxybenzyl-(1RS,3RS; 1RS,3SR)-2,2-dimethyl-3-(2-methylprop-1-enyl)cyclopropanecarboxylate), piperonyl butoxide and butylcarbityl(6-propylpiperonyl)ether, aldrin, chlorodane, dieldrin, endrin, heptachlor, lindane, DDT, DEET, nicotine, rotenone, pyrethrum, azadirachtin, oxalic acid, borax (sodium tetraborate decahydrate), disodium octaborate tetrahydrate, arsenic trioxide, lead arsenate, thallium sulfate, others, and so forth and the like.

Permethrin is a preferred insecticide. It is an effective termiticide, and, among its other benefits, it also may be considered to have termite feeding inhibiting properties. It is available from many sources. For example, it may be found commercially available in "Permanone 40" or Permanone 90" (Aventis Environmental Science), with concentrations indicated by the numerals, "40" or "90," which represent the percents by weight of active ingredients in solution.

Any suitable amount of the insecticide may be employed. The amount may be any that is sufficient to kill, control and/or repel a target invertebrate when the composition is applied to, and preferably dried on or in, a substrate. The insecticide may be, independently at each occurrence, say, from 0.01% to 50% by weight of total composition, say, from 0.1% or 1% to 3%, 5% or 10% by weight of the total composition. Such values may be considered to be approximate or precise. Preferably, especially when embodied as a termiticide where the target invertebrate is a termite, the insecticide may be added in an amount by weight of base fire retardant latex paint formulation or base fire retardant latex paint formulation with mold inhibitor, independently at each occurrence, at about from 0.5% to 10%, to include about from 0.5%, 0.75% or 1% to 1.5%, 2%, 3%, 4% or 5%. For instance, the termiticide may be added at about from 0.75% to 1.5%, say, about 1% (actual example, some 0.9%), by weight of the base fire retardant latex paint formulation or base formulation plus mold inhibitor.

The term, "mold inhibitor," as employed herein is an agent that can kill, control, or prevent growth of mold, mildew, or fungus, and so forth and the like flora, especially when formulated with a basic fire retardant paint, with insecticide. A mold inhibitor may be fire retardant or fire accelerative, but, in the latter case, does not accelerate fire to a degree that the overall composition which contains the mold inhibitor cannot be considered to be a fire retardant composition. Preferably, however, use of a fire retardant paint with insecticide and mold inhibitor, for example, on a solid material as the substrate, reduces growth of the flora of interest significantly, say, at least about 60%, at least about 85%, or at least about 99% or even at least about 99.9%, if it does not kill it outright, for a significant time, say, at least about thirty days, at least about six months, or at least about 360 days or a year, if not, in effect, indefinitely, as tested by appropriate test methodology. For example, the test method may be by ASTM D5590-94, Determination of Resistance of a Coating Material to Fungal Growth.

As the mold inhibitor, any suitable substance may be employed. Preferably, the mold inhibitor is compatible with the other components, and further is soluble or suspendable therewith. For instance, the mold inhibitor may be a quaternary organic ammonium halide, to include a quaternary alkyl ammonium halide, especially such a halide having at least one short chain and at least one medium chain alkyl group, for example, two of each, and an otherwise corresponding quaternary alkyl aromatic ammonium halide. The short chain alkyl group may be inclusive of, separately at each occurrence, a one- to an about five-carbon group, especially a one- to four-carbon group, for example, a methyl, ethyl, propyl, and so forth group. The medium chain alkyl group may be inclusive of, separately at each occurrence, an about six- to an about thirty-carbon group, especially a six- to an about twenty-carbon group, for example, hexyl, heptyl, octyl, nonyl, decyl, undecyl, dodecyl, a thirteen-, fourteen-, fifteen- or sixteen-, seventeen-, eighteen-, nineteen-, or twenty-carbon group, and so forth. Preferably, the short chain alkyl group is methyl and/or ethyl, especially methyl, and the medium chain alkyl group is an eight- to twelve-carbon group, to include a mixture thereof, especially decyl, which can be present as an n-alkyl group. The halide is advantageously a chloride. For example, the mold inhibitor employed may be didecyldimethylammonium chloride. An aromatic group, to include aryl, alkaryl and/or arylalkyl, for example, a benzyl and/or ethylbenzyl group may be present, for instance, in a quaternary organic to include a quaternary alkyl aromatic ammonium halide mold inhibitor, for example, alkyldimethylbenzylammonium chloride. The mold inhibitor may be a mixture containing more than one mold inhibitor compound. An increase in concentration of any quaternary ammonium halide mold inhibitor may provide for a corresponding reduction in the amount of ammonium phosphate or ammonium orthophosphate.

Tint(s) and/or color(s) may be added to obtain a pastel or colored paint.

The present fire retardant paint with insecticide and optionally mold inhibitor may penetrate to some degree, say, a small amount. It may reside substantially on the surface of the substrate. However that may be, preferably, once dried, it leaves a generally opaque film on the surface of a flammable solid substrate even though more than one coat may be needed to cover completely. This dried film results in a composition or residue of the same, which is believed to be relatively safe in application and after drying. Suitable precautions, however, should be undertaken. This results also in a versatile fire retardant paint with insecticide, or insecticide and mold inhibitor, properties, which can be employed in situations in which a painted surface is desired. Advantageously, there is nothing in the composition of the present invention known to be substantially harmful to wood per se, plywood, any other wood product, or the paper of gypsum board, in general. Further, since the present composition is typically applied on the surface, it should not interact with, degrade, or otherwise deteriorate plywood, sheathing, other types of glued or composite wood products, or paper-clad or paper products, particularly deep in the substrate.

The present composition may be applied to the materials by any suitable method. Known methods may be employed. The paint may be applied by spraying, say, by hand-held trigger sprayers, pump-up pressure sprayers, or any other type of manual or automatic power-assisted spraying apparatus, including by power paint rollers (saturated rollers); airless sprayers; brushing; dipping; and so forth. Advantageously, the wet paint is applied by spraying. Brushing is a simple, effective expedient. These and other application processes are well known in the art and are subject to many variations. The composition of the present invention is applied at any suitable concentration or rate to produce a material treated with an effective amount of the same.

The following examples further illustrate the invention. Therein, parts and percentages are given by weight, unless otherwise specified.

EXAMPLE 1

In a clean, appropriately sized Cowles mixer, the following component ingredients were added in the order shown to make a base intumescent latex paint, with percentages by weight:

| | |
|---|---|
| Water, bulk | 20.0% |
| TAMOL 731A NaOH stabilized sodium salt of polymeric maleic acid (Rohm and Haas) | 0.16% |
| RHODOLINE 226/35 sodium polyacrylate (Rhodia Canada, Inc.) | 0.10% |
| BYK-346 polyether modified poly-dimethyl-siloxane in dipropyleneglycol monomethyl ether (48%) (BYK-Chemie USA, Inc.) | 0.05%. |

Further added under agitation were the following component ingredients:

| | |
|---|---|
| TI-PURE titanium dioxide pigment (DuPont Chemicals) | 7.39% |
| EXOLIT AP 422 ammonium polyphosphate powder (Clariant Canada, Inc.) | 20.69% |
| TECH PE 200 technical pentaerythritol (Hercules Canada, Inc.) | 9.00% |
| Powder melamine (DSM Melamine Americas, Inc.) | 9.47%. |

The mixture was ground for ten minutes, and the bottom and sides of the mixer were scraped. Then added was the following component ingredient:

NATRASOL 250 MXR hydroyethylcellulose (Hercules Canada, Inc.) 0.31%. The mixture was ground to a smooth paste to a 2~3 fineness. Then added, with mixing, were the following component ingredients:

| | |
|---|---|
| RHODOLINE 226/35 sodium polyacrylate | 0.10% |
| PROXEL GXL aqueous mixture containing 1,2-benzisothiazol-3(2H)-one, sodium hydroxide, and dipropyleneglycol (Brenntag Canada, Inc.) | 0.03% |
| TEXANOL 2,2,4-trimethyl-1,3-pentanediol monoisubutyrate (Eastman Chemical Company) | 0.75% |
| StanChem 5238 vinyl acetate copolymer emulsion (54-56% polymer/solids, 44-46% water) (StanChem, Inc.) | 21.77% |
| Water, bulk | 6.71% |
| SCOTCHLITE K25 glass bubbles (3M Canada) | 1.52% |
| ACRYSOL RM-8W hydrophobically modified ethylene oxide urethane block copolymer in water (Rohm and Haas) | 0.56%. |

This provided a base intumescent fire retardant latex paint, which was pumped to a storage tank for later filling, or filled into proper containers.

To a sample of the base intumescent fire retardant latex paint was added a sample of PERMANONE 90 (Aventis) (90% by weight permethrin) at 1.0% by weight of the base formulation. This was stirred into the mix to complete the formulation (pH ~7.6).

Finished intumescent fire retardant latex paint with insecticide can be pumped to a storage tank for later filling, or filled into proper containers. A sample of the finished intumescent fire retardant latex paint with insecticide was successfully stored "in the can" for about a year.

EXAMPLE 2

The base liquid paint of Example 1 was applied to the surface of Douglas fir tongue and groove decking at a rate of 300 square feet per U.S. gallon in two coats, and the painted decking was allowed to dry in a conditioned room at 70 degrees F. and 50% relative humidity until the paint had dried and reached a constant mass. Once dried to constant mass, the decking panels were tested under the ASTM E84 procedure and resulted in a Flame Spread Rating of "5."

The finished paint with insecticide should have a low Flame Spread Rating also.

When untreated Douglas fir decking panels from the same batch of tongue and groove decking were tested under the ASTM E84 procedure to determine the inherent flammability of the panels, the otherwise identical but untreated panels had a flame spread rating of "55."

EXAMPLE 3

The finished paint of Example 1 was applied in a thin layer by brush to the surface of SPF plywood, and a number of cardboard cubes. The finished paint went on well.

The painted cubes were subjected to testing under the procedures outlined in the American Wood-Preservers' Association Standard E1-97 protocol. A single-choice test was performed. Southern yellow pine blocks (standards) and cardboard cubes (control and test) were exposed to termites.

The design was a randomized complete block with 5 replicates. Glass jars were autoclaved and 150 gm of sterilized sand was added to each jar. Thirty mL of distilled water were added to jars. Test samples consisted of small cardboard cubes treated with 0%, 0.5% and 1% w/w termiticide and coated with exterior acrylic stucco or 1% w/w fire retardant coating with insecticide (termiticide) from Example 1. Test samples were weighed before placement in jars. Representative samples of each treatment were used to determine initial percent moisture. Samples were weighed, dried, and reweighed. Four hundred termites (workers and soldiers) were put on the opposite side of the jar from the sample. Lids were placed loosely on the jar. Samples were removed from jars after four weeks of exposure to termites, washed free of sand, dried, and weighed. Samples were visually rated using the rating in the E1-97 standard. This rating system is as follows: 10—sound, surface nibbles permitted; 9—light attack; 7—moderate attack, penetration; 4—heavy attack; and 0—failure. Data were analyzed using analysis of variance and Tukey's W procedure to compare treatments.

Termites brought soil on the samples covered in stucco but did not bring soil on the samples covered in the fire retardant with termiticide from Example 1. They made holes in the stucco to get to the cardboard on the inside but did not make holes in the fire retardant with termiticide of Example 1. Thus, at the end of the four-week test procedure, after each cube was exposed to 400 Formosan subterranean termites under laboratory conditions, the cubes coated with the fire retardant latex paint with insecticide of Example 1 appeared to be untouched. This would demonstrate, or at least it strongly suggests, strong repellent action and/or rapid mortality. All of the termites were dead in the cubes treated with the Example 1 composition. Note, Table:

TABLE

Mean rating and percentage loss in dry weight of samples treated with various chemicals after four weeks exposure to 400 Formosan subterranean termites under laboratory conditions.

| Treatment | Mean rating | Significance | Mean % dry weight loss | Significance |
|---|---|---|---|---|
| Composition | 10.0 | a | 02 | c |
| 1% + stucco | 7.6 | b | 15 | c |
| 0.5% + stucco | 7.2 | b | 26 | b |
| 0% + stucco | 6.6 | b | 14 | c |
| SY Pine | 0.0 | c | 53 | a |

Means within a column followed by different letters are significantly different at the 0.05 level based on analysis of variance and Tukey's W procedure.

EXAMPLE 4

To a sample of the base intumescent fire retardant latex paint within Example 1 was added with stirring 3.0% Mason CS428 alkyldimethylbenzylammonium chloride (80% aqueous solution) (Mason Chemical Co). It contains alkyldimethylbenzylammonium chloride ($C_{12-16}$) (CAS #68424-85-1) (80% by weight); ethanol (CAS #64-17-5) (10% by weight); and water (10% by weight). This provided an intermediate latex paint composition, i.e., an intumescent fire retardant latex paint with mold inhibitor.

To this mix can be added the PERMANONE 90 insecticide at 1.0% by weight of the total composition. Stirring into the mix can complete the formulation.

The finished intumescent fire retardant latex paint with mold inhibitor and insecticide can be pumped to a storage tank for later filling, or filled into proper containers.

EXAMPLE 5

The intermediate paint composition of Example 4 was applied to the surface of Douglas fir tongue and groove decking, dried, and tested under the ASTM E84 procedure, as set forth in Example 2. This resulted in a Flame Spread Rating of "0." The finished latex paint with mold inhibitor and insecticide composition of Example 4 should have a low Flame Spread Rating also.

The finished latex paint with mold inhibitor and insecticide of Example 4 can be applied in a thin layer by brush to the surface of SPF plywood, and subjected to ASTM D5590-94 testing with *Stachybotrys chartarum*. The intermediate latex paint composition with mold inhibitor of Example 4 has shown mold-free test results, and the final product also including the insecticide should show favorable, if not mold-free, test results also.

The finished latex paint with mold inhibitor and insecticide of Example 4 can be applied on the surface of SPF plywood, and a number of cardboard cubes, as in Example 3. It should go on well, and the cubes can be tested under the American Wood-Preservers' Association Standard E1-97 protocol. The final product with the composition of Example 4 should show favorable test results also.

CONCLUSION TO THE INVENTION

The present invention is thus provided. Various feature(s), part(s), step(s), subcombination(s) and/or combination(s) may be employed with or without reference to other feature(s), part(s), step(s), subcombination(s) and/or combination(s) in the practice of the invention, and numerous adaptations and modifications can be effected within its spirit, the literal claim scope of which is particularly pointed out as follows:

What is claimed is:

1. An intumescent fire retardant paint composition, which comprises an intumescent fire retardant paint foundation in combination with an insecticide in an amount that is sufficient to kill, control and/or repel a target invertebrate, and a mold inhibitor in an amount sufficient to kill, control, or prevent growth of *Stachybotrys chartarum*, wherein the composition, after it is applied to, and dried and reached a constant mass on a solid, flammable substrate, i.e., after treatment of the substrate, provides for the following:
    a reduction in surface burning characteristics by at least 50% when compared to untreated, solid, flammable substrate as tested by ASTM E-84 (Steiner Tunnel Test);
    the kill, control and/or repelling of the target invertebrate; and
    a reduction of the growth of the *Stachybotrys chartarum* by at least 85% or about 85% for at least 30 days or about 30 days as tested by ASTM D-5590-94 (Determination of Resistance of a Coating Material to Fungal Growth Test).

2. The composition of claim 1, wherein the insecticide includes a member selected from the group consisting of malathion, parathion, diazinon (0,0-diethyl-0,2-isopropyl-6-methyl(pyrinodine-4-yl)phosphorthioate), permethrin ((3-phenoxyphenyl)methyl(+)cis-trans-3-(2,2-dichloroethenyl)-2,2-dimethylcyclopropanecarboxylate) or CAS No. 52645-53-1), resmethrin, d-trans-allethrin, tetramethrin ((1-cyclohexene-1,2-dicarboximide)methyl-2,2-dimethyl-3-(2-methylpropenyl)cyclopropanecarboxylate), sumithrin (3-phenoxybenzyl-(1RS,3RS; 1RS,3SR)-2,2-dimethyl-3-(2-methylprop-1-enyl)cyclopropanecarboxylate), piperonyl butoxide, butylcarbityl(6-propylpiperonyl) ether, aldrin, chlorodane, dieldrin, endrin, heptachlor, lindane, DDT, DEET, nicotine, rotenone, pyrethrum, azadirachtin, oxalic acid, borax (sodium tetraborate decahydrate), disodium octaborate tetrahydrate, arsenic trioxide, lead arsenate, thallium sulfate, and a combination thereof; and the mold inhibitor includes a quaternary alkyl ammonium halide, which includes at least one short chain alkyl group and at least one medium chain alkyl group, wherein the short chain alkyl group is, separately at each occurrence, a one- to five-carbon group, and the medium chain alkyl group is, separately at each occurrence, a six- to an thirty-carbon group.

3. The composition of claim 1, wherein the insecticide includes permethrin, and the mold inhibitor includes a quaternary organic ammonium halide.

4. The composition of claim 1, which consists essentially of said foundation, insecticide, and mold inhibitor, optionally in combination with the substrate on or in which the composition resides.

5. An intumescent fire retardant latex paint composition, which comprises an intumescent fire retardant paint foundation, which is a latex, in combination with an insecticide in an amount that is sufficient to kill, control and/or repel a target invertebrate, wherein the composition, after it is applied to, and dried and reached a constant mass on a solid, flammable substrate, i.e., after treatment of the substrate, provides for the following:
    a reduction in surface burning characteristics by at least 50% when compared to untreated, solid, flammable substrate as tested by ASTM E-84 (Steiner Tunnel Test); and
    the kill, control and/or repelling of the target invertebrate.

6. The composition of claim 5, wherein an ammonium phosphate is employed as a fire retardant ingredient.

7. The composition of claim 6, wherein the paint foundation includes ingredients added with water approximately in percentages by weight, as follows:

| | |
|---|---|
| Ammonium phosphate solids | 15~30%, |
| Thermoplastic latex resin | 10~30%, |
| Nitrogenous spumific | 7~13%, |
| Carbonific | 7~13%, |
| Opacifying agent | 5~10%, |
| Glass additive | 1~5%, |
| Ester alcohol | 0.5~1.5%, |
| Hydroxyalkylcellulosic | 0.1~1%, and |
| Wetting and/or other agent(s), exclusive of possible mold inhibitor | 0.1~2%. |

8. The composition of claim 7, wherein the ingredients of the paint foundation include at least one of the following:
    the thermoplastic latex resin includes a polyvinyl acetate;
    the nitrogenous spumific includes melamine powder;
    the carbonific includes a polyol;
    the opacifying agent is inert and inorganic;
    the glass additive includes a glass in a form of bubbles;
    the hydroxyalkylcellulosic includes hydroxymethylcellulose and/or hydroyethylcellulose;
    the wetting and/or other agent(s) includes a pigment dispersing agent, a defoamer colloid, a silicone surfactant, a paint preservative/biocide, and a rheology modifier.

9. The composition of claim 6, wherein the paint foundation includes ingredients approximately in percentages by weight, as follows:

| | |
|---|---|
| Water (bulk) | 25~33%, |
| Ammonium polyphosphate powder | 20~21%, |
| Vinyl acetate latex (aqueous) | 21~22%, |
| Melamine powder | 9~10%, |
| Pentaerythritol | 8.5~9.5%, |
| Titanium dioxide powder | 7~8%, |
| Glass bubbles (0.12~0.63 g/cc) | 1~2%, |
| 2,2,4-trimethyl-1,3-pentanediol monoisubutyrate | 0.6~0.8%, |
| Hydroxyethylcellulose | 0.2~0.4%, and |
| Wetting and/or other agents, exclusive of possible mold inhibitor | 1%. |

10. The composition of claim 9, wherein the insecticide includes permethrin, present in an amount about from 0.1 to 3 percent by weight of total composition.

11. The composition of claim 6, wherein the insecticide includes permethrin.

12. The composition of claim 7, wherein the insecticide is present in an amount about from 0.1 to 5 percent by weight of total composition.

13. The composition of claim 5, wherein the insecticide includes malathion, parathion, diazinon (0,0-diethyl-0,2-isopropyl-6-methyl(pyrinodine-4-yl)phosphorthioate), permethrin ((3-phenoxyphenyl)methyl(±)cis-trans-3-(2,2-dichloroethenyl)-2,2-dimethylcyclopropanecarboxylate) or CAS No. 52645-53-1), resmethrin, d-trans-allethrin, tetramethrin ((1-cyclohexene-1,2-dicarboximide)methyl-2,2-dimethyl-3-(2-methylpropenyl)cyclopropanecarboxylate), sumithrin (3-phenoxybenzyl-(1RS,3RS; 1RS,3SR)-2,2-dimethyl-3-(2-methylprop-1-enyl)cyclopropanecarboxylate), piperonyl butoxide, butylcarbityl(6-propylpiperonyl) ether, aldrin, chlorodane, dieldrin, endrin, heptachlor, lindane, DDT, DEET, nicotine, rotenone, pyrethrum, azadirachtin, oxalic acid, borax (sodium tetraborate decahydrate), disodium octaborate tetrahydrate, arsenic trioxide, lead arsenate, thallium sulfate, or a combination thereof.

14. The composition of claim 5, which consists essentially of said foundation and insecticide, optionally in combination with the substrate on or in which the composition resides.

15. An intumescent fire retardant latex paint composition, which comprises an intumescent fire retardant paint foundation, which is a latex, in combination with an insecticide in an amount that is sufficient to kill, control and/or repel a target invertebrate, and a mold inhibitor in an amount sufficient to kill, control, or prevent growth of *Stachybotrys chartarum*, wherein the composition, after it is applied to, and dried and reached a constant mass on a solid, flammable substrate, i.e., after treatment of the substrate, provides for the following:
   a reduction in surface burning characteristics by at least 50% when compared to untreated, solid, flammable substrate as tested by ASTM E-84 (Steiner Tunnel Test);
   the kill, control and/or repelling of the target invertebrate; and
   a reduction of the growth of the *Stachybotrys chartarum* by at least 85% or about 85% for at least 30 days or about 30 days as tested by ASTM D-5590-94 (Determination of Resistance of a Coating Material to Fungal Growth Test).

16. The composition of claim 15, wherein an ammonium phosphate is employed as a fire retardant ingredient.

17. The composition of claim 16, wherein the paint foundation includes ingredients added with water approximately in percentages by weight, as follows:

| | |
|---|---|
| Ammonium phosphate solids | 15~30%, |
| Thermoplastic latex resin | 10~30%, |
| Nitrogenous spumific | 7~13%, |
| Carbonific | 7~13%, |
| Opacifying agent | 5~10%, |
| Glass additive | 1~5%, |
| Ester alcohol | 0.5~1.5%, |
| Hydroxyalkylcellulosic | 0.1~1%, and |
| Wetting and/or other agent(s), exclusive of possible mold inhibitor | 0.1~2%. |

18. The composition of claim 16, wherein the insecticide includes a member selected from the group consisting of malathion, parathion, diazinon (0,0-diethyl-0,2-isopropyl-6-methyl(pyrinodine-4-yOphosphorthioate), permethrin ((3-phenoxyphenyl)methyl(+)cis-trans-3-(2,2-dichloroethenyl)-2,2-dimethylcyclopropanecarboxylate) or CAS No. 52645-53-1), resmethrin, d-trans-allethrin, tetramethrin ((1-cyclohexene-1,2-dicarboximide)methyl-2,2-dimethyl-3-(2-methylpropenyl)cyclopropartecarboxylate), sumithrin (3-phenoxybenzyl-(1RS,3RS; 1RS,3SR)-2,2-dimethyl-3-(2-methylprop-1-enyl)cyclopropanecarboxylate), piperonyl butoxide, butylcarbityl(6-propylpiperonyl) ether, aldrin, chlorodane, dieldrin, endrin, heptachlor, lindane, DDT, DEET, nicotine, rotenone, pyrethrum, azadirachtin, oxalic acid, borax (sodium tetraborate decahydrate), disodium octaborate tetrahydrate, arsenic trioxide, lead arsenate, thallium sulfate, and a combination thereof; and the mold inhibitor includes a quaternary alkyl ammonium halide, which includes at least one short chain alkyl group and at least one medium chain alkyl group, wherein the short chain alkyl group is, separately at each occurrence, a one- to five-carbon group, and the medium chain alkyl group is, separately at each occurrence, a six- to an thirty-carbon group.

19. The composition of claim 16, wherein the insecticide includes permethrin, and the mold inhibitor includes a quaternary organic ammonium halide.

20. The composition of claim 15, which consists essentially of said foundation, insecticide, and mold inhibitor, optionally in combination with the substrate on or in which the composition resides.

\* \* \* \* \*